US007191111B2

(12) United States Patent  
Schuppe

(10) Patent No.: US 7,191,111 B2
(45) Date of Patent: Mar. 13, 2007

(54) METHOD, APPARATUS, AND COMPUTER PROGRAM PRODUCT FOR IMPLEMENTING DYNAMIC COSIMULATION

(75) Inventor: Raymond Walter Manfred Schuppe, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 10/660,161

(22) Filed: Sep. 11, 2003

(65) Prior Publication Data

US 2005/0060133 A1 Mar. 17, 2005

(51) Int. Cl.
*G06F 17/50* (2006.01)

(52) U.S. Cl. .............. 703/13; 703/14; 703/17; 703/20; 703/22; 703/23; 703/24; 703/25; 716/1; 716/4; 716/5; 716/7; 717/124; 717/168; 717/114

(58) Field of Classification Search ........ 710/113, 710/22; 703/27, 20, 14, 2, 13; 716/4; 717/114
See application file for complete search history.

(56) References Cited

U.S. PATENT DOCUMENTS

| | | | | |
|---|---|---|---|---|
| 6,026,230 | A * | 2/2000 | Lin et al. ............... | 703/13 |
| 6,134,516 | A * | 10/2000 | Wang et al. ............ | 703/27 |
| 6,212,489 | B1 * | 4/2001 | Klein et al. ............ | 703/13 |
| 6,651,225 | B1 * | 11/2003 | Lin et al. ............... | 716/4 |
| 6,766,284 | B2 * | 7/2004 | Finch .................... | 703/20 |
| 6,785,873 | B1 * | 8/2004 | Tseng ................... | 716/4 |
| 6,810,442 | B1 * | 10/2004 | Lin et al. ............... | 710/22 |
| 7,010,470 | B2 * | 3/2006 | Kodosky et al. ...... | 703/2 |
| 2002/0129181 | A1 * | 9/2002 | Lahiri et al. .......... | 710/113 |
| 2004/0022107 | A1 * | 2/2004 | Zaidi et al. ........... | 365/202 |
| 2004/0226000 | A1 * | 11/2004 | Finch .................... | 717/114 |
| 2004/0243959 | A1 * | 12/2004 | Takemura ............. | 716/7 |
| 2004/0254779 | A1 * | 12/2004 | Wang et al. ........... | 703/27 |
| 2005/0102125 | A1 * | 5/2005 | Tseng ................... | 703/14 |
| 2006/0015313 | A1 * | 1/2006 | Wang et al. ........... | 703/14 |

OTHER PUBLICATIONS

Haufe et al□□Speeding Up Simulation by Emulation—A Case Study□□Design Automation and Test in Europe conference DATE'99, Munich, Germany Mar. 9-12, 1999□□Proceedings User's Forum 127-134.*

(Continued)

*Primary Examiner*—Kamini Shah
*Assistant Examiner*—Cuong Van Luu
(74) *Attorney, Agent, or Firm*—Joan Pennington

(57) ABSTRACT

Dynamic cosimulation is implemented using a cosimulation bridge for data exchange between a primary simulator and a secondary simulator, and a plurality of user selected optimization control signals defined over the cosimulation bridge. At least one user selected optimization control signal is identified for disabling the cosimulation bridge. The primary simulator and secondary simulator are dynamically disengaged for ending data exchange responsive to disabling the cosimulation bridge. Responsive to optimization control signal going inactive, the primary simulator and secondary simulator are dynamically re-engaged for data exchange. The optimization control signals include a single sided disable; a two independent disable; a functional OR disable; a functional AND disable, and suspend signals. The single sided disable and the two independent disable enable disabling one side of the cosimulation bridge and not the other side. Both sides of the cosimulation bridge are disabled together using the functional OR disable and the functional AND disable.

15 Claims, 13 Drawing Sheets

OTHER PUBLICATIONS

Lahiri et al., Fast Performance Analysis of Bus-Based System-On-Chip communication Architecture, IEEE/ACM International Conference on Computer-Aided Design (ICCAD), Nov. 1999.*

S. Schmerler, Y. Tanurhan, K. D. Muller-Glaser, A Backplane Approach for Cosimulation in High-Level System Specification Environment, 0-8186-7156-4/95 1995 IEEE.*

* cited by examiner

COSIMULATION STARTUP SEQUENCE

STEP 1

STEP 2

STEP 3

METHOD, APPARATUS, AND COMPUTER PROGRAM PRODUCT FOR IMPLEMENTING DYNAMIC COSIMULATION

FIELD OF THE INVENTION

The present invention relates generally to the data processing field, and more particularly, relates to a method, apparatus and computer program product for implementing dynamic cosimulation.

DESCRIPTION OF THE RELATED ART

Computer simulation of digital hardware systems has become a common technique used for the verification of hardware systems, reducing cost and time required. Sometimes it is necessary to create a software bridge between hardware description language (HDL) simulators for verification of an application specific integrated circuit (ASIC) or a custom Integrated Circuit (IC). The bridging between two software simulators is called cosimulation. These software simulators can be bridged via a software linkage joining the two simulators to form a single process, a fast inter-process communication on the same workstation, and a Transmission Control Protocol/Internet Protocol (TCP/IP) socket based communication over a network.

Conventional cosimulation between the simulators often involves having one simulator call the other simulator similar to a function call. With sequential cosimulation, one simulator is always suspended while its peer is active. This results in large wait times and causes ineffective use of hardware accelerators.

Cosimulation can be set up to execute in parallel and the simulators run independent of each other for defined intervals. In parallel cosimulation exchanges are still required even if port data does not change to ensure synchronization between the two simulators. Then a user must specify intervals on both sides of co-simulation, either in terms of cycles or time. By maximizing the interval between exchanges overall performance can be optimized and multiple processors can be leveraged. While maximizing the interval for optimal performance the user must take care to ensure the interval is not too large. If too large of an interval is specified signal transitions may be missed and this can result in incorrect behavior.

This parallel mode of cosimulation has the added benefit of utilizing multiple processors on the workstation or over a network that is running the cosimulation. This allows the cosimulation to complete faster. While cosimulation is a fairly complex skill, both of these types of cosimulation are considered normal practices and state of the art with regard to linking simulators.

A problem with parallel cosimulation is that the overhead of the information exchange between simulators in such an environment can become significant when one of the simulation engines is a hardware accelerator or when the exchange is being done over a network.

Known cosimulation tools used to optimize the inter-process cosimulation between simulators in the software bridge between the simulators may be very efficient for their intended tasks; however such solutions are very specific for the type of interface being modeled, and therefore do not provide a generic method of optimization. Since the optimization is implemented in software such solutions become inefficient for use in hardware accelerators.

SUMMARY OF THE INVENTION

A principal object of the present invention is to provide a method, apparatus and computer program product for implementing dynamic cosimulation. Other important objects of the present invention are to provide such method, apparatus and computer program product for implementing dynamic cosimulation substantially without negative effect and that overcome many of the disadvantages of prior art arrangements.

In brief, a method, apparatus and computer program product are provided for implementing dynamic cosimulation. A cosimulation bridge is used for data exchange between a primary simulator and a secondary simulator. A plurality of user selected optimization control signals is defined over the cosimulation bridge. At least one user selected optimization control signal is identified for disabling the cosimulation bridge. The primary simulator and secondary simulator are dynamically disengaged for ending data exchange responsive to disabling the cosimulation bridge.

In accordance with features of the invention, checking continues to determine whether the identified at least one user selected optimization control signal remains active. Responsive to the identified at least one user selected optimization control signal being inactive, the cosimulation bridge is enabled; and the primary simulator and secondary simulator are dynamically re-engaged for data exchange. The plurality of user selected optimization control signals include a single sided disable; a two independent disable; a functional OR disable; and a functional AND disable. The single sided disable and the two independent disable enable disabling one side of the cosimulation bridge and not the other side. Both sides of the cosimulation bridge are disabled together using the functional OR disable and the functional AND disable. A suspend signal can be defined on either side of the cosimulation bridge and is asserted by one side of the cosimulation to indicate that this side of the cosimulation should be suspended.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiment, a simple method is provided that allows the optimization of the inter-process communication to be implemented in logic connected to the cosimulation bridge interfaces. This provides the user with total control and flexibility with regard to the optimization of inter-process communication between the simulators, and the ability to write the optimization logic in synthesizable RTL. Fully synthesizable RTL executes at full hardware acceleration speeds in a hardware accelerator, and thus minimizes the amount of software interaction required with the hardware accelerator.

Figure 1A:
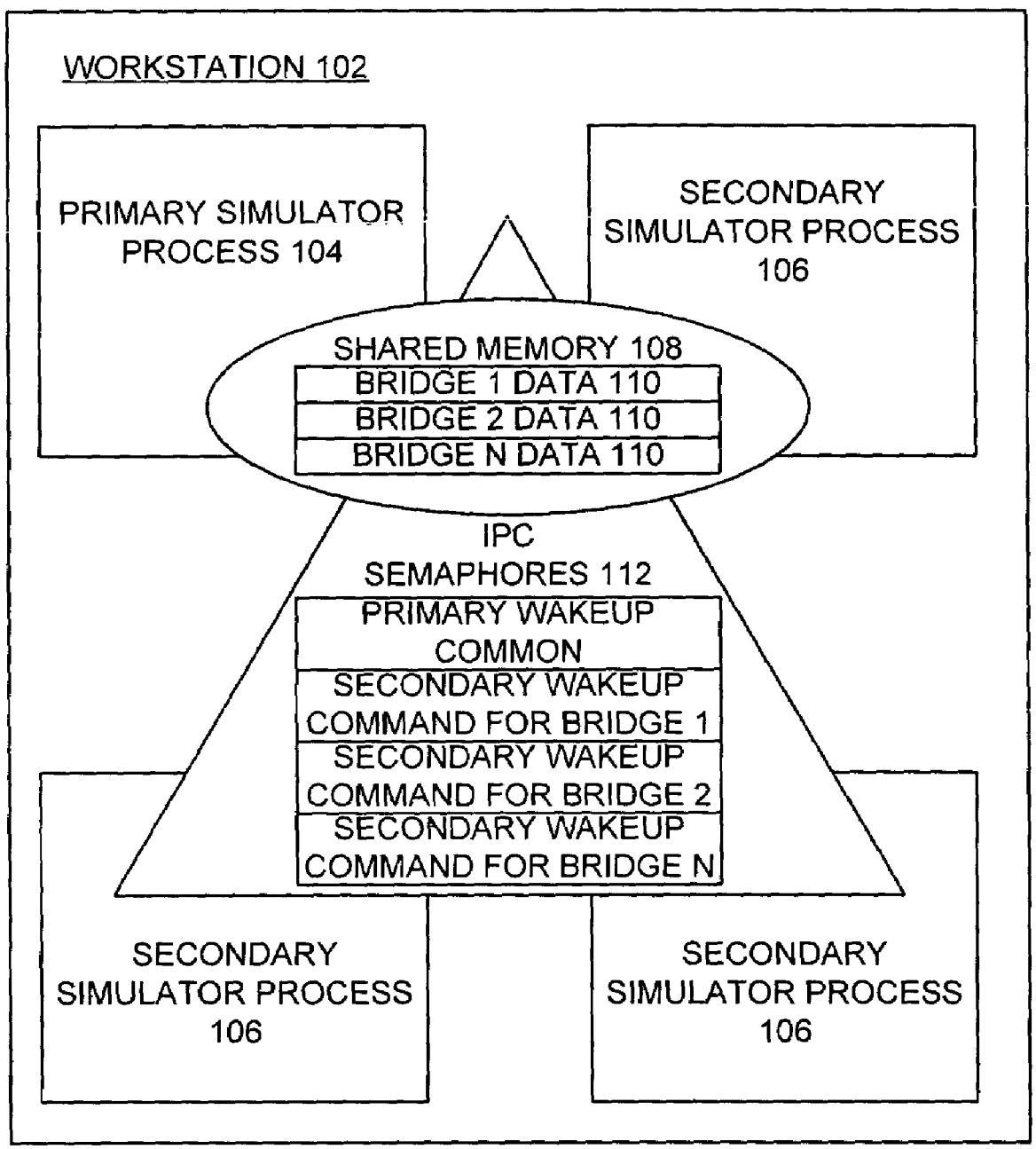
FIG. 1A is a block diagram representation illustrating a single workstation cosimulation bridge system for implementing dynamic cosimulation methods in accordance with the preferred embodiment.

Having reference now to the drawings where like reference numerals designate corresponding parts in the various figures, in FIG. 1A there is shown a single workstation cosimulation bridge system generally designated by reference character 100 for implementing dynamic cosimulation methods in accordance with the preferred embodiment. The single workstation cosimulation bridge system 100 includes a workstation 102, a primary simulator process 104, and a plurality of secondary simulator processes 106, a shared memory 108 providing a plurality of bridges 110 for exchanging simulation data between the simulator process 104 and respective secondary simulator processes 106, and Inter Process Communication (IPC) semaphores 112. The IPC semaphores 112 are used as signals between the processes 104, 106 to indicate that updated data is in the shared memory. The IPC semaphores 112 include a Primary Wakeup Common, a Secondary Wakeup Bridge 1, a Secondary Wakeup Bridge 2, and a Secondary Wakeup Bridge N.

Figure 1B:
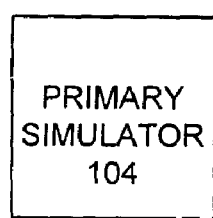
FIG. 1B is a block diagram representation illustrating a cosimulation startup sequence for the single workstation cosimulation bridge system of FIG. 1A in accordance with the preferred embodiment.
Figure 1B:
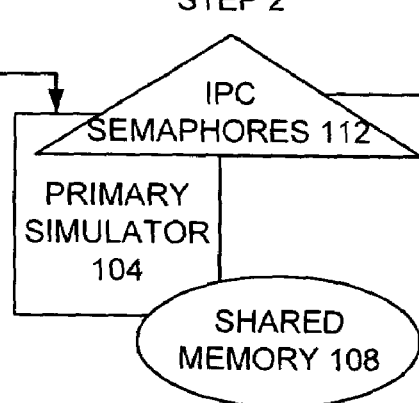
Figure 1B:
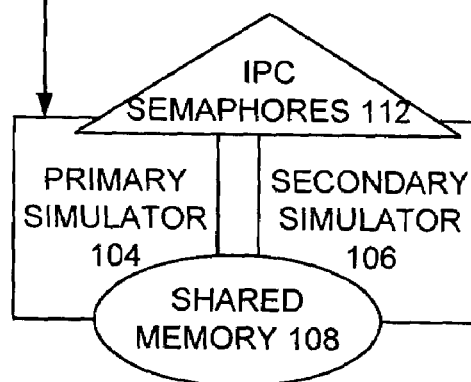

FIG. 1B illustrates a cosimulation startup sequence for the single workstation cosimulation bridge system 100. First at step 1, the primary simulator process or simulator 104 starts and at step 2 configures shared memory 108 and IPC semaphores 112. Then at step 3 the primary simulator 104 invokes respective secondary simulators 106, each using shared memory 108 and one respective bridge 110. All of the multi-process cosimulation processes 104, 106, use the common shared memory 108 and semaphore structure 112 as a means for inter-process communication. This allows a great deal of flexibility as any of these master simulator interfaces can either work together with a cosimulation slave interface for IBM cycle simulators or a cosimulation slave interface for event commercial simulators using the Verilog PLI. While this provides probably the fastest means of inter process communication, both simulators 104, 106 must execute on the same workstation 102.

A separate application called cosim_socket of the preferred embodiment is provided that allows the user to enable a cosimulation over a TCP/IP network using a socket interface. Cosimulation over a network is inherently much slower than cosimulation on the same workstation. Therefore a network cosimulation should be used when it is not possible to run both simulations on the same workstation. TCP/IP socket based cosimulation may be required when two simulators must run on different platforms or operating systems or it may not be logistically possible to have both simulations in the same physical location.

In accordance with features of the preferred embodiment, the separate cosim_socket application was created that interfaces with the other applications using the same shared memory 108 and semaphore structure 112 of the single workstation cosimulation bridge system 100, instead of re-writing the various cosimulation applications to work via a TCP/IP socket. The cosim_socket application reproduces the shared memory and semaphore structure on a remote machine. In this way all of the existing cosimulation applications can now execute remotely via TCP/IP. The cosim_socket application can be used over the internal intranet or the global internet using a VPN tunnel set up with the remote location when transferring data over the global Internet. Once the second copy of the shared data structure is established on the remote machine, the two versions are kept in sync using the minimum amount of data exchange between the two workstations. The cosim_socket application also takes care of dealing with architectural differences between workstations, such as big endian and little endian byte ordering, thus you can run cosimulations between AIX, Linux and Sun workstations without worrying about internal representation of simulation data.

Figure 2A:
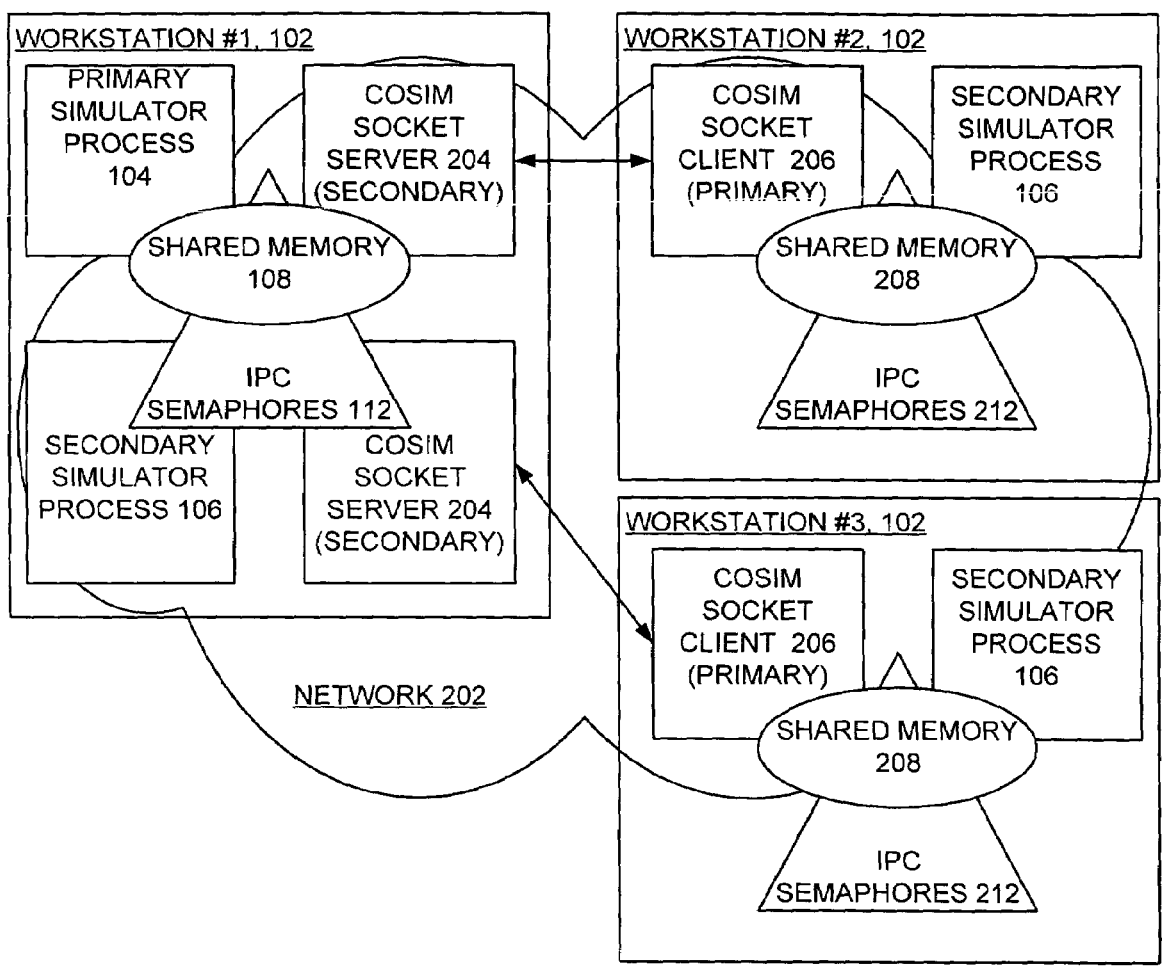
FIG. 2A is a block diagram representation illustrating an exemplary Transmission Control Protocol/Internet Protocol (TCP/IP) network cosimulation bridge system for implementing dynamic cosimulation methods in accordance with the preferred embodiment.

Referring now to FIG. 2A, there is shown an exemplary Transmission Control Protocol/Internet Protocol (TCP/IP) network cosimulation bridge system generally designated by reference character 200 for implementing dynamic cosimulation methods in accordance with the preferred embodiment. The illustrated TCP/IP network cosimulation bridge system 200 includes a plurality of workstations #1–3, 102 coupled to a network 202, a primary simulator process 104 on workstation #1, 102, a secondary simulator process 106 on workstations #1, 102 and a respective secondary simulator processes 106 on workstations #2, #3, 102. Workstation #1, 102 includes a shared memory 108 providing a plurality of bridges 110 and Inter Process Communication (IPC) semaphores 112 for exchanging simulation data between the primary simulator process 104 and respective secondary simulator processes 106.

In the illustrated TCP/IP network cosimulation bridge system 200, workstation #1, 102 includes multiple spawned cosimulation (cosim) socket server processes 204 (secondary). For each remote connection the cosimulation server application spawns a process to act as a surrogate secondary simulator process. Each of the workstations #2, #3, 102 includes a respective cosim socket client 206 (primary) that is connected to the cosim socket server spawning the cosim socket server processes 204. These cosim socket clients 206 act as a surrogate primary simulator process. Each of the workstations #2, #3, 102 includes a shared memory 208 and IPC semaphores 212. The cosim socket application including the cosim socket servers 204 and cosim socket clients 206 replicates respective shared memory 208 and IPC semaphores 212 on the remote machines workstations #2, #3, 102. It does this by sending packets through a TCP/IP socket and the data is replicated as shown in FIG. 2B.

It should be understood that the present invention is not limited to the illustrated TCP/IP network cosimulation bridge system 200. The present invention can be used with various configurations.

Figure 2B:
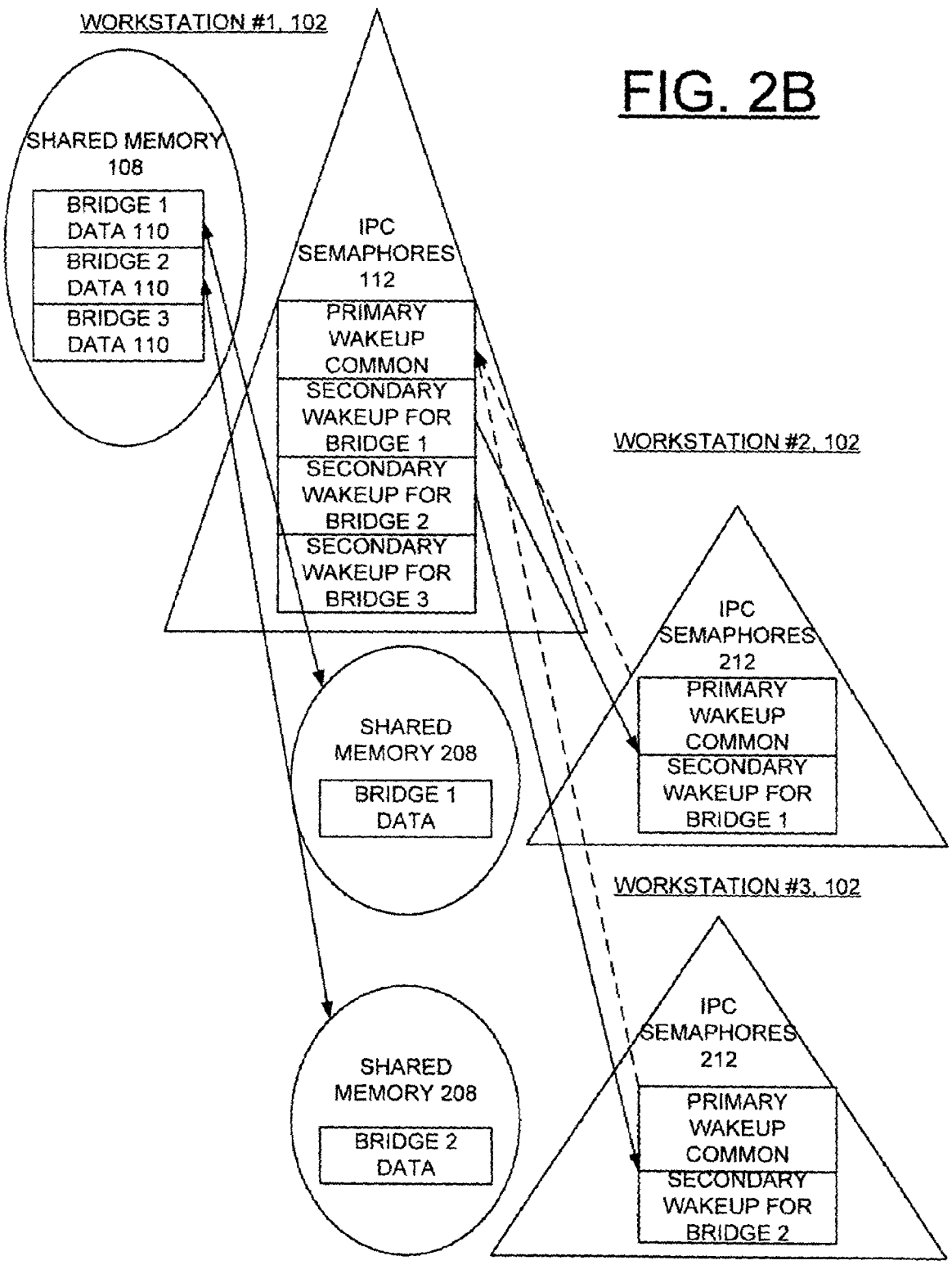
FIG. 2B is a block diagram representation illustrating shared memory and IPC semaphores for the TCP/IP network cosimulation bridge system of FIG. 2A in accordance with the preferred embodiment.

FIG. 2B illustrates shared memory 108, 208 and IPC semaphores 112, 212 for the TCP/IP network cosimulation bridge system 200. Shared memory 108 provides a plurality of bridges 110 for exchanging simulation data between the primary simulator process 104 and each of the respective secondary simulator processes 106. The cosim_socket server 204 takes on a secondary simulation role. The cosim_socket client 206 mimics the master (primary simulator 104) on the remote machine or respective workstations #2, #3, 102. The remote startup is more complex, as illustrated and described with respect to FIGS. 3A, 3B, 3C and 3D.

Referring now to FIGS. 3A, 3B, 3C and 3D are block diagram representations illustrating a cosimulation startup sequence for the TCP/IP network cosimulation bridge system 200 in accordance with the preferred embodiment. When running a TCP/IP based cosimulation through cosim_socket application, there are two basic differences from a cosimulation executing in one host. First before starting the master simulation 104 a copy of the cosim_socket application must be started on the master simulator's workstation #1, 102 in server mode as indicated in a block 302. The run script that normally directly invokes the slave simulator 106 in the single workstation bridge system 100, must now cause the slave simulator 106 on the remote machine #2, 102 to be invoked through a copy of cosim_socket in client mode. The cosim_socket application must be started with the same user id that will be used for the master simulation, this is needed so cosim_socket can attach to the shared memory and semaphore that the master simulator will create. To invoke the cosim_socket application in server mode you must give it the -master_server flag and specify a unique TCP/IP port number for the master's host machine, for example, "cosim_socket-master_server 5005" will setup the server to receive cosim connections on TCP/IP port 5005. This cosim_socket TCP/IP server application will spawn copies of itself for every cosimulation connection that is received, the primary process does not terminate when an individual cosimulation has completed. The cosim_socket-master_server only needs to be started once, then the window where it is running can be minimized and ignored.

Then the primary or master simulator 104 is started as indicated in a block 306. The master simulator's cosim interface creates and configures the shared memory 108 and semaphores 112 that it uses for inter process communication as indicated in a block 304. The master simulator's cosim interface will then invoke the entity_name.run script and wait for a slave simulation 106 to connect to shared memory 108 and semaphores 112 as indicated in a block 308. Normally the run script would invoke the slave simulation directly, and the slave simulation would use one of the slave simulator API interfaces to connect to the shared memory 108 and semaphores 112.

Figure 3A:
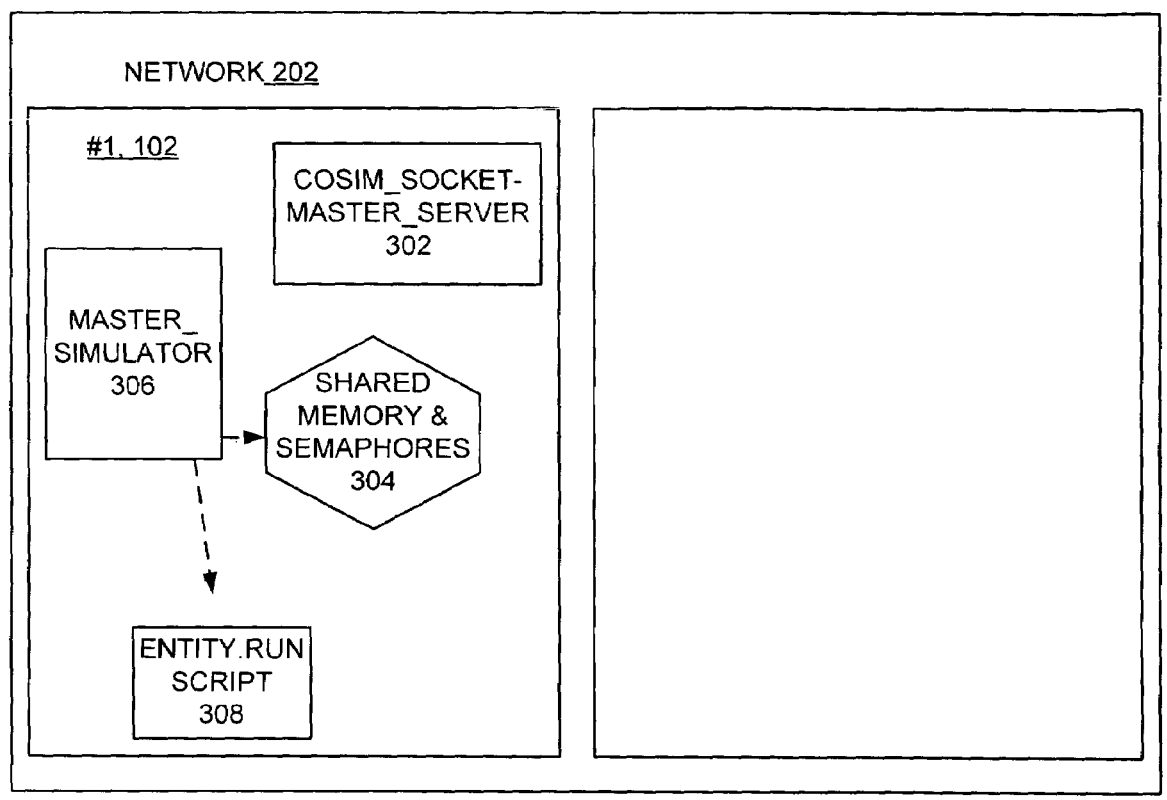
FIGS. 3A, 3B, 3C and 3D are block diagram representations illustrating a cosimulation startup sequence for the TCP/IP network cosimulation bridge system of FIG. 2A in accordance with the preferred embodiment.
Figure 3B:
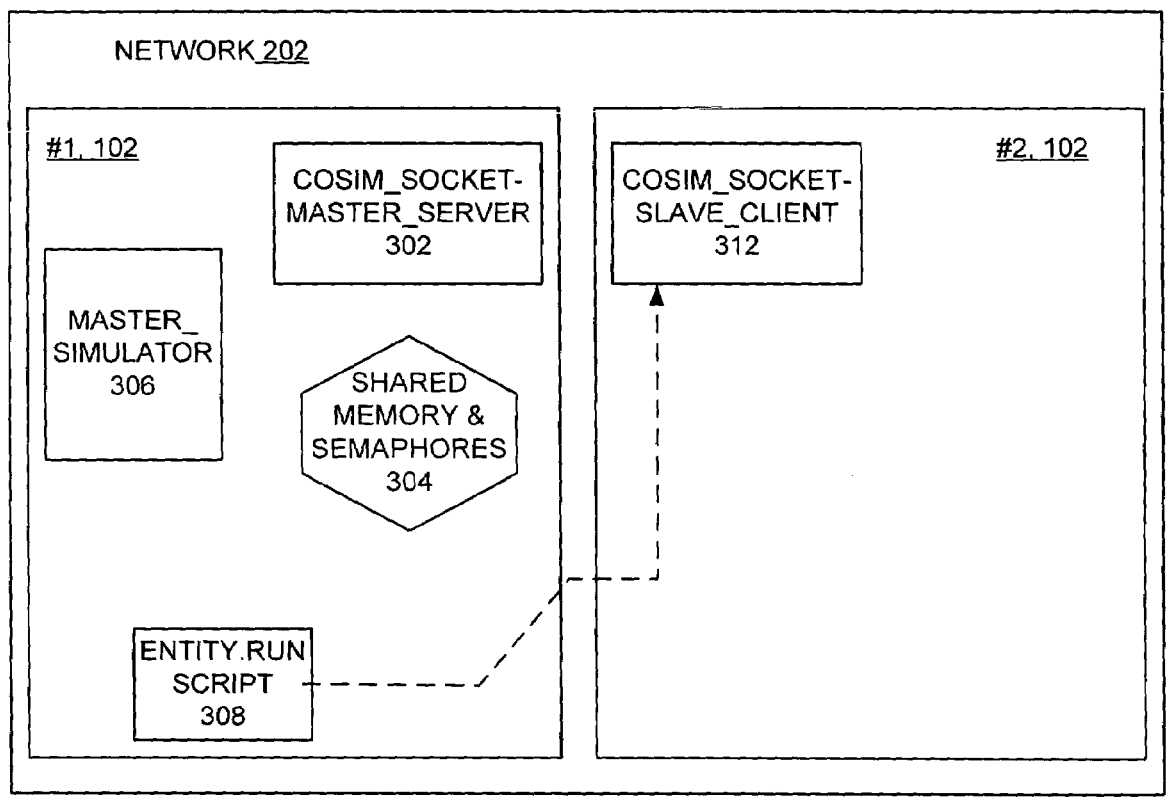

Referring to FIG. 3B, the entity_name.run script in the TCP/IP cosimulation bridge system 200 causes the slave simulator to be invoked through a copy of cosim_socket in client mode on the remote machine #2, 102 as indicated in a block 312. There are various ways that the run script can remotely invoke the cosim_socket-slave_client; for example, standard unix commands such as rsh, remsh or rexec can be used. Remotely invoked commands via rlogin or telnet using the TCL expect application can be used. It is also possible to write a remote start application and to restrict the specific commands that can be invoked remotely. Since the cosimulation takes place over a specific TCP/IP socket, the cosim_socket application on the remote machine #2, 102 does not need to be invoked under the same user id as on the master simulation's machine #1, 102. The cosim_socket application on the remote machine #2, 102 will run in client mode, to invoke it you will need to provide the TCP/IP socket number provided to cosim_socket running in -master_server mode on the master simulator's host machine #1, 102; the TCP/IP name or address of the master simulator's host machine; and the command and arguments needed to invoke the slave simulation. The command and arguments need not invoke the slave simulator 106 directly, a script that calls the slave simulator could be specified as an argument here.

Figure 3C:
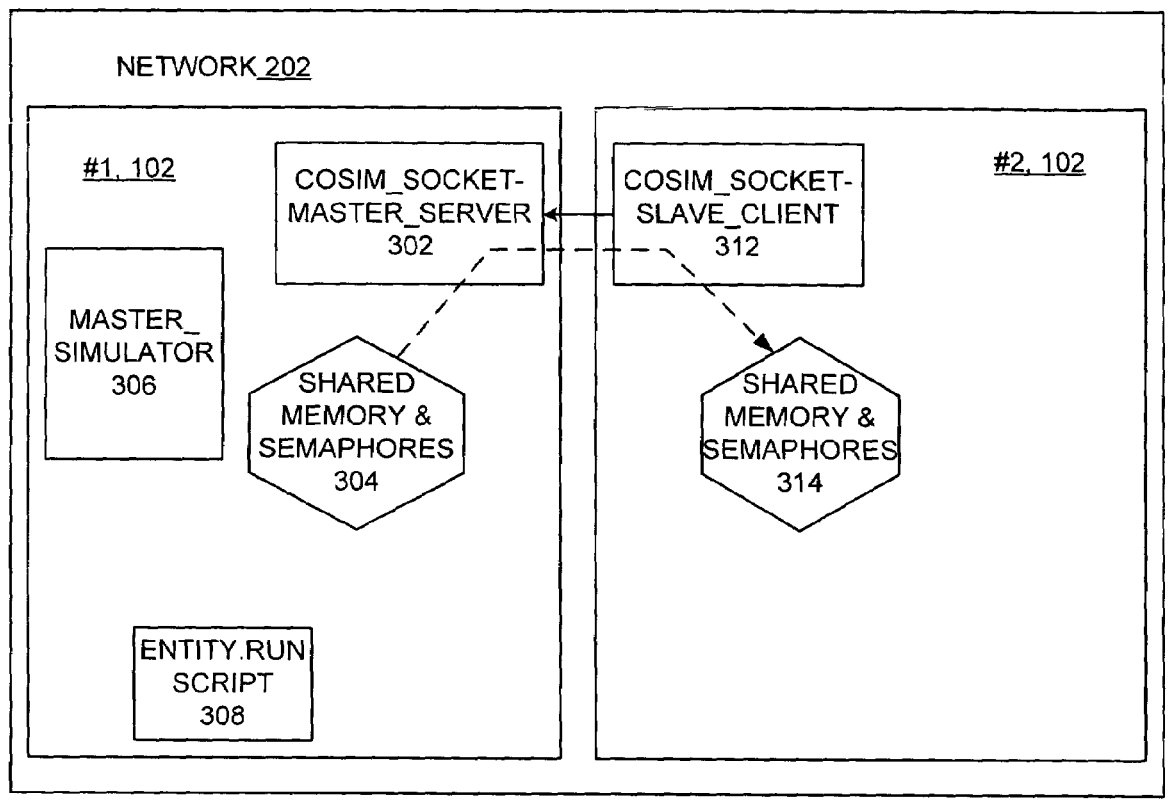

Referring to FIG. 3C, next the shared memory 208 and semaphores 212 are reproduced on the remote machine #2, 102 as indicated in a block 314 as follows. The cosim socket client 312 connects to the cosim socket server 302 running on the master simulator's machine #1, 102. The master cosim socket server 302 spawns a copy of itself and attaches to the shared memory 108 and semaphores 112. A copy of the shared memory is sent back to the cosim socket client 312 on the remote machine #2, 102. The cosim socket client 312 reproduces the shared memory 208 and semaphores 212 in the remote system.

Figure 3D:
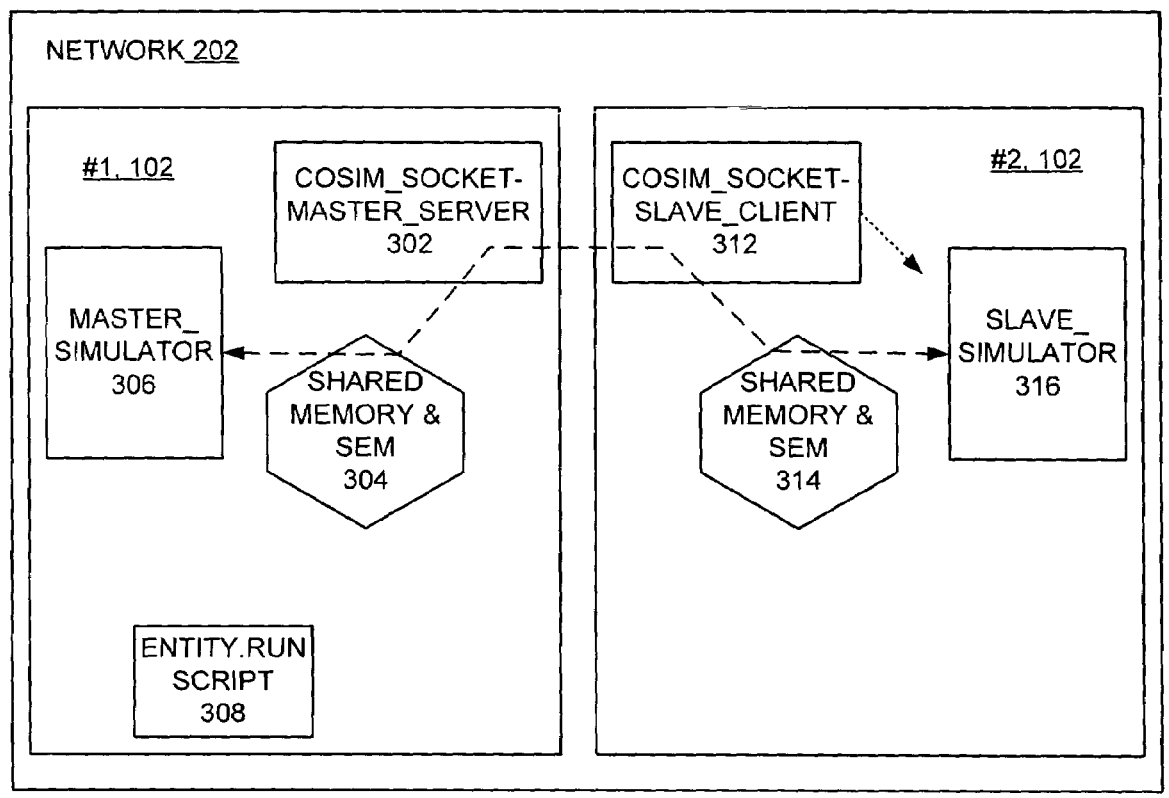

Referring to FIG. 3D, when the remote copy of the shared memory 212 and semaphores 212 are set up, the cosim_socket client 312 starts the secondary or slave simulator 316 as specified by the arguments that were provided as indicated in a block 316. Then co-simulation continues over TCP/IP until terminated via the master simulator 306.

The dynamic cosimulation method of the preferred embodiment enables various different simulators 104, 106 to work together in a dynamic fashion including, for example, VerilogXL (Cadence), NCVerilog (Cadence), VCS (Synopsys), MTI Verilog (Mentor), MTI VHDL (Mentor), MVL-SIM (IBM), MESA (IBM) AWAN (IBM), Quickturn and Axis Verilog simulators.

In accordance with features of the preferred embodiment, the user is enabled to specify optional optimization control signals over a cosimulation bridge including disables from either side; and suspends from either side of the cosimulation bridge. From either side of a cosimulation the user can specify a disable port. The disable port allows the users logic to dynamically disengage and re-engage cosimulation of the simulators 104, 106 in the cosimulation. The ability to dynamically disable the cosimulation interface provides a mechanism for minimizing data exchange and is essential for maximizing throughput on hardware acceleration platforms. Inter process communication does not occur when the bridge is disabled. When the bridge is disabled the advances of time/cycles in the two simulations 104, 106 will vary. This can introduce a non-reproducible random element into the cosimulation. When the cosimulation interface has been disabled a simulator 104, 106 may need to suspend operation while the peer simulator continues to run in a disabled mode. By defining a suspend pin the users logic has access to such a function.

In accordance with features of the preferred embodiment, a disable pin is defined from one or both sides of the cosimulation bridge to enable asynchronous operations in parallel mode. When the HDL sets a disable pin to '1' this indicates that a connection to the other side of the cosimulation bridge is not desired at this time, for a value other than '1' normal synchronization is requested. The disable pins are valid signals that are passed through to the other side of the cosimulation bridge. When a disable is requested it is not instantaneous, at least one exchange will be processed so that the disable pin value will be reflected on the other side of the bridge. When disabled, the periodic cosim API invocations of simulators 104, 106 no longer result in transactions over the cosimulation bridge. Cosim APIs in simulators 104, 106 just check to see if one or more disable signals are still active. During disables it is possible for one side of a co-simulation to advance significantly further than the other, in terms of time or cycles. If both sides of a bridge are disabled, the difference is unpredictable as it depends on relative model sizes, number of processors and system load, and can introduce a random element into the cosimulation.

Figure 4:
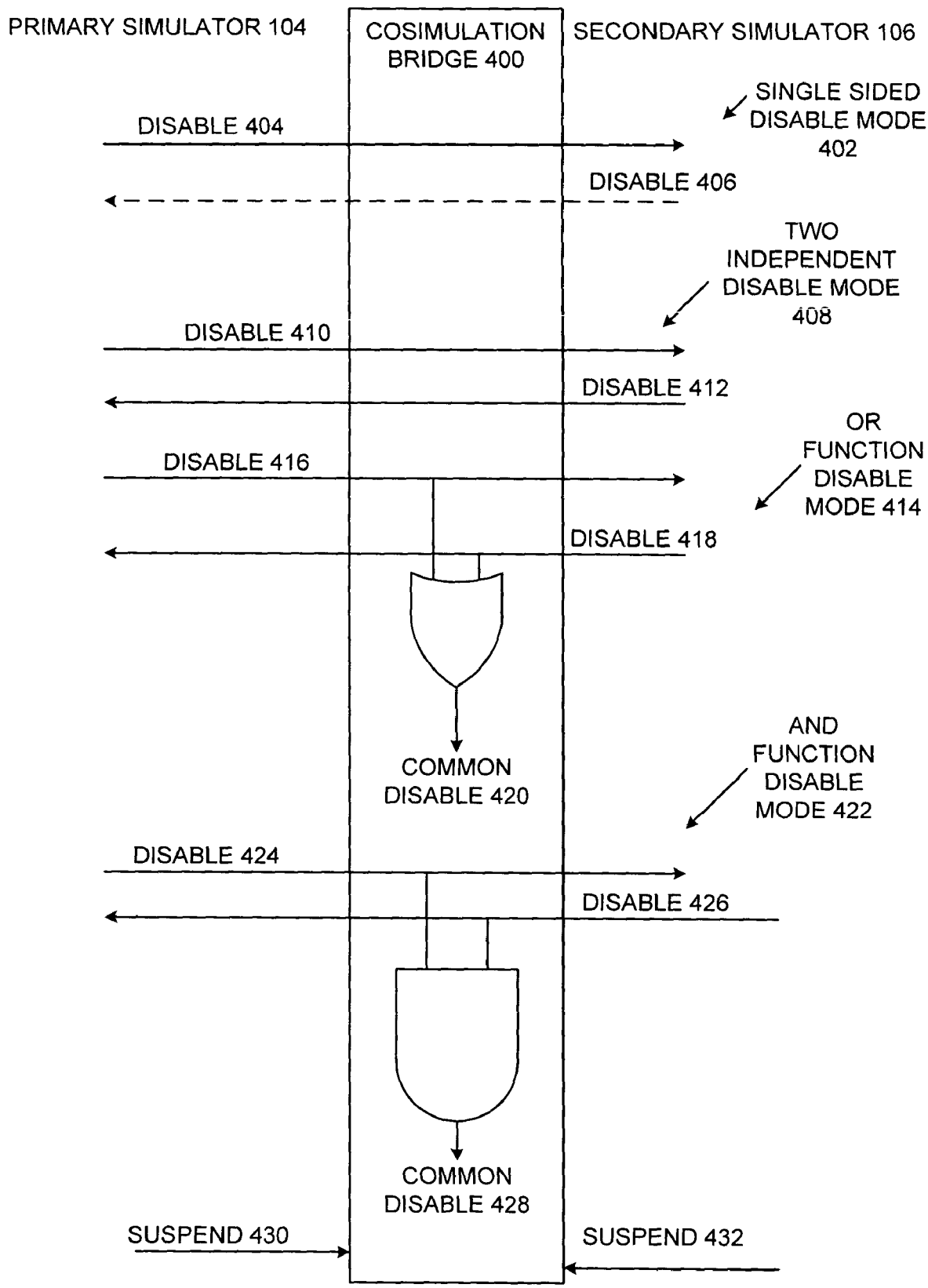
FIG. 4 is a block diagram representation illustrating cosimulation bridge optimization control apparatus for implementing dynamic cosimulation methods in accordance with the preferred embodiment.

Referring now to FIG. 4, there is shown cosimulation bridge apparatus for implementing dynamic cosimulation methods in accordance with the preferred embodiment. In FIG. 4, a cosimulation bridge 400 is shown between primary simulator 104 and secondary simulator 106. Four types of disables are supported for use in the single workstation bridge system 100 and the TCP/IP network cosimulation bridge system 200.

A single sided disable mode is generally designated by reference character 402. In the single sided disable mode 402, only one side of the interface 400 has a disable pin. The primary simulator 104 has a disable pin DISABLE 404 for the single sided disable mode 402. Alternatively, the secondary simulator 106 has a disable pin DISABLE 406 for the single sided disable mode 402. Cosimulation stops only on one simulator 104,106 side of the cosimulation bridge 400.

A two independent disable mode generally designated by reference character 408 includes a respective disable pin DISABLE 410, DISABLE 412 on each side 104, 106 of the cosimulation bridge 400. The disable pins DISABLE 410, DISABLE 412 can only disable their side of the cosimulation bridge 400.

For the single sided disable mode 402 and two independent disable mode 408, it is possible to disable one side of the cosimulation bridge 400 and not the other, the non disabled side can suspend indefinitely effectively halting the simulation (time or cycles) until the interface is once again enabled by the side that selected the disable. In these cases, care must be taken in halting the non-disabled side of the cosimulation. Incorrect use of the single sided disable mode 402 and the two independent disable mode 408 can result in a deadlock or simulator termination.

A functional OR disable mode generally designated by reference character 414 pins includes a respective disable pin DISABLE 416, DISABLE 418 on each simulator 104, 106 side of the cosimulation bridge 400. An actual disable by the functional OR disable mode 412 labeled common disable 420 is shared between the master and slave interface and is the logical OR of the two disable values. Either simulator 104,106 side of the cosimulation bridge 400 can activate its respective disable pin DISABLE 416, DISABLE 418 to provide the common disable 420.

A functional AND disable mode generally designated by reference character 422 includes a respective disable pin DISABLE 424, DISABLE 426 on each simulator 104, 106 side of the cosimulation bridge 400. An actual disable labeled common disable 428 is shared between the master and slave interface and is the logical AND of the two disable values. Both simulator 104, 106 side of the cosimulation bridge 400 must activate its respective disable pin DISABLE 424, DISABLE 426 to provide the common disable 420. When one simulator 104, 106 side of the cosimulation bridge 400 deactivates its respective disable pin DISABLE 424, DISABLE 426, the common disable 420 is deactivated.

For the functional OR mode 414 and the functional AND mode 422, both sides of the cosimulation bridge 400 are disabled together. In these cases, both sides run independent of each other without any data exchange or synchronization. While a deadlock in these modes is unlikely it can still happen if the disables are interconnected over the bridge 400. When running both sides independently, if one side of the cosimulation is just idling and not doing anything productive, processor time may be wasted.

In addition to interface disable signals, a suspend signal labeled SUSPEND 430, SUSPEND 432 can be defined on either side of the bridge 400. The suspend signal tells the cosimulation bridge interface 400 that the one side of the simulation has nothing to do and that this side of the cosimulation should be suspended so that CPU cycles are not wasted. Depending on your environment the suspend may be permanent or temporary. For situations where the suspend is permanent a more appropriate name for the suspend signal would be a done signal. In most cases, the suspend signal is permanent, the disable can only be temporary for the functional AND disable mode 422 or the functional OR disable mode 414 of the bridge interface 400.

When the cosimulation bridge 400 is active, the simulations 104, 106 are continuously suspending at synchronization/exchange points or transactions; however, only the slower side of the cosimulation actually incurs any delay. When the cosimulation bridge 400 is disabled these suspends and data exchanges are skipped thus allowing the disabled side of the simulation to run free until once again the cosimulation bridge 400 is enabled. Asserting the suspend signal while the interface is disabled will in most cases cause a suspend (transaction) to occur, a few exceptions exist for the master simulator.

The relation of the suspend signal to the disable and different results during a suspend are summarized in the following Table 1:

TABLE 1

| Interface Disable | Suspend Signal | Result |
| --- | --- | --- |
| Enabled | Don't Care | Cosimulation Bridge execute normally. Suspends happen all the time as part of the data exchange. |
| Disabled | Off (not set to 1) 0, z, x | The disabled side(s) run independent of each other, they use CPU cycles. |
| Disabled | On (set to 1) | The disabled side will either: 1. Wait for an exchange that will re-enable the interface and continue. 2. Wait for an exchange, then gracefully disconnect from the cosimulation and terminate the simulator. This last exchange is needed to ensure the masters knows about the disconnect. 3. Wait for an exchange that may never arrive. The other side continues to execute independently until it exits. The suspended simulator terminates when the cosimulation is over. A terminate exchange is always sent from the master. 4. Terminate the entire cosimulation immediately, master_suspend only. In all cases (1–4) the suspended simulation no longer uses CPU cycles. |

The first suspend action "Wait for an exchange that will re-enable the interface and continue" occurs when the disable is a two sided functional AND 422 and the other side is not suspended; or when the disable is a two sided functional OR 414 and the other side has caused the disable and the local disable signal is not set. Corresponds to yes for decision blocks 520, 522 or 642, 644 in FIGS. 5 and 6B respectively.

The second suspend action "wait for an exchange, then gracefully disconnect from the cosimulation and terminate the simulator" can only occur in the slave simulators 106. The second suspend action will occur when this is a one sided disable 402; or when this is a two sided independent disable 408 and the disable is from this side. Corresponds to no for decision block 522 in FIG. 5.

The third suspend action "wait for an exchange that may never arrive" can only occur in slave simulators 106. The third suspend action will occur when the disable is a two sided functional OR 414 and this side (the slave) caused the disable. The master will never create a transaction until it terminates because this bridge has been disabled permanently. The third suspend action will occur when the disable is a two sided functional AND 422 and both sides have suspended. This corresponds to a special case of no for decision block 522 and yes for decision block 520 in FIG. 5 respectively.

The fourth suspend action "terminate the entire cosimulation immediately" will only occur on the master simulator 104 when no future possibilities of transactions exist on any of the slave simulator bridge interfaces. This means all slave simulators 106 are disabled from the master side 104. This corresponds to block 624 in FIG. 6A. A second parallel cosimulation interface without any asynchronous disable capability (never disabled) will always have a scheduled transaction and thus makes a master suspend signal non functional. A sequential cosimulation bridge will keep a master suspend from terminating while items in its sensitivity list are changing. The embodiment of this invention allows the user to configure both sequential and parallel bridges in the same cosimulation environment.

Figure 5:
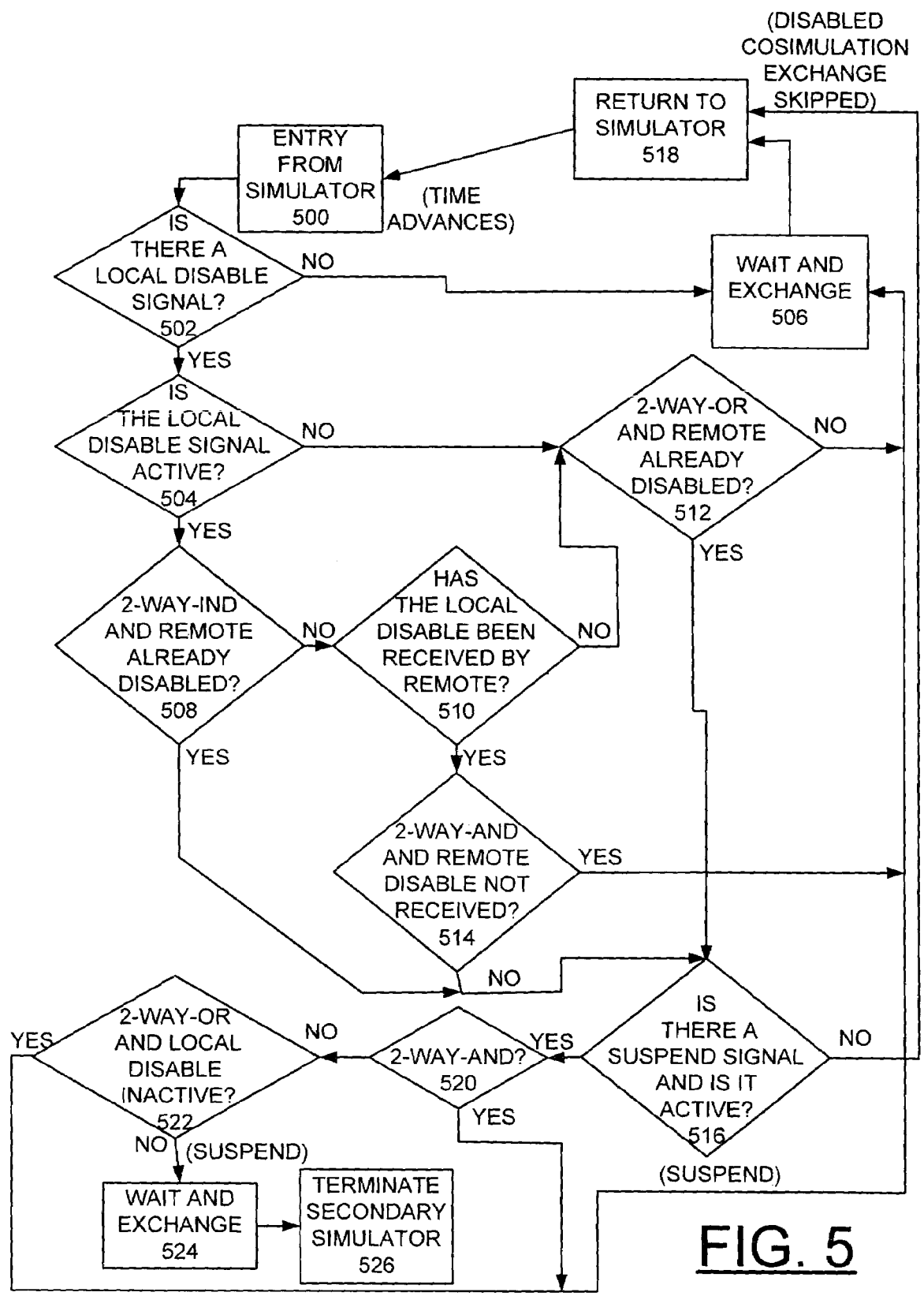
FIG. 5 is a logic flow diagram illustrating exemplary operations of a secondary side of a cosimulation in accordance with the preferred embodiment.

Referring now to FIG. 5, there are shown exemplary logic flow operations of a secondary side of a cosimulation in accordance with the preferred embodiment starting with an entry from secondary or slave simulator 106 as indicated in a block 500. Checking for a local disable signal is performed as indicated in a decision block 502. When a local disable signal is identified at decision block 502, then checking is performed to determine whether the local disable signal is active as indicated in a decision block 504. When a local disable signal is not identified at decision block 502, then wait and exchange is provided as indicated in a block 506.

When determined that the local disable signal is active at decision block 504, then checking for the two independent disable 408 and remote already disabled is performed as indicated in a decision block 508. The remote already disabled occurs when the remote disable was received by a previous exchange and the remote disable is still currently active. The remote in this case is the primary or master simulator 104. When the two independent disable 408 and remote already disabled is not identified at decision block 508, then checking is performed to determine whether the local disable has been received by the remote or master simulator 104 as indicated in a decision block 510.

When the local disable has not been received by the master simulator 104 at decision block 510 and when the local disable signal is not active at decision block 504, then checking for the two-way-OR 414 and remote already disabled is performed as indicated in a decision block 512. If not, then wait and exchange is provided at block 506.

When the local disable has been received by the master simulator 104, then checking for the 2-way-AND 422 and remote disable not received is performed as indicated in a decision block 514. The remote disable not received occurs the remote disable was not yet received by a previous exchange or the remote disable is still currently inactive or off. If the two-way-AND 422 and remote disable not received is not identified at decision block 514, or if the 2-way-OR 414 and remote already disabled is identified at block 512, or if the two independent disable 408 and remote already disabled is identified at decision block 506, then checking if there is a suspend signal and if the suspend signal is active is performed as indicated in a decision block 516.

If the suspend signal is not identified or is not active, then the sequential operations return to simulator as indicated in a block 518 with the disabled cosimulation exchange skipped. Otherwise if the suspend signal is identified and is active, then checking for the two-way-AND 422 is performed as indicated in a decision block 520. If the two-way-AND 422 is identified, then wait and exchange is provided at block 506 for the suspend. If the two-way-AND 422 is not identified, then checking for the two-way-OR 414 and local disable inactive is performed as indicated in a decision block 522. The decision in block 522 is to see if this is a two-way-OR 414 disable and the reason that we are disabled is due to the disable pin on the remote master simulator 104, the path taken would have been no at decision block 504, yes at decision block 512, yes at decision block 516, and no at decision block 520 to decision block 522. If two-way-OR 414 and local disable inactive is identified, then wait and exchange is provided at block 506 for the suspend. If two-way-OR 414 and local disable inactive is not identified at decision block 522, then a wait and exchange is provided as indicated in a block 524. This final exchange allows the primary side 104 to continue with any remaining secondary simulators 106. Then the secondary simulator 106 is terminated as indicated in a block 526.

Figure 6A:
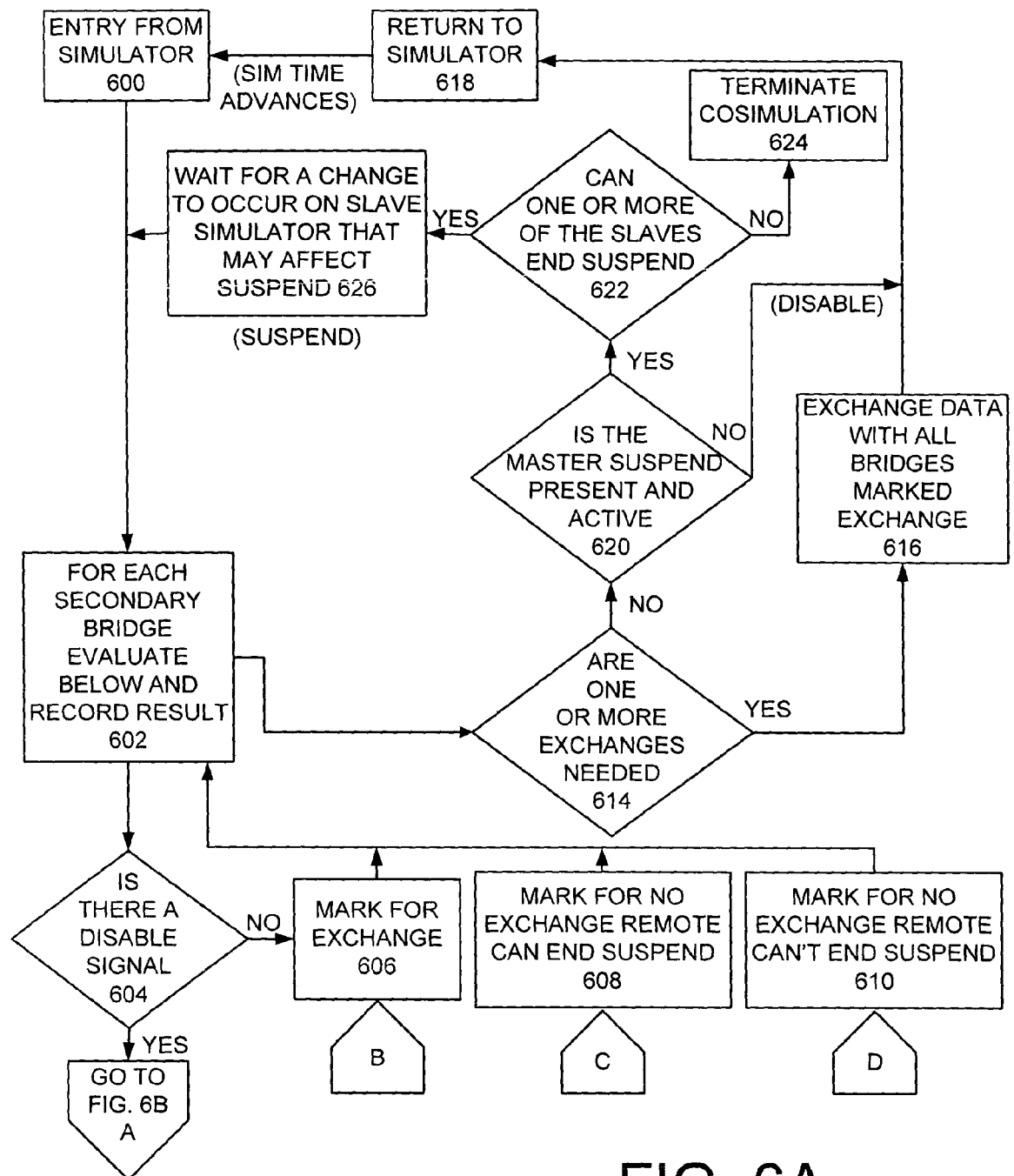
FIGS. 6A, and 6B are logic flow diagrams illustrating exemplary operations of a primary side of a cosimulation in accordance with the preferred embodiment.
Figure 6B:
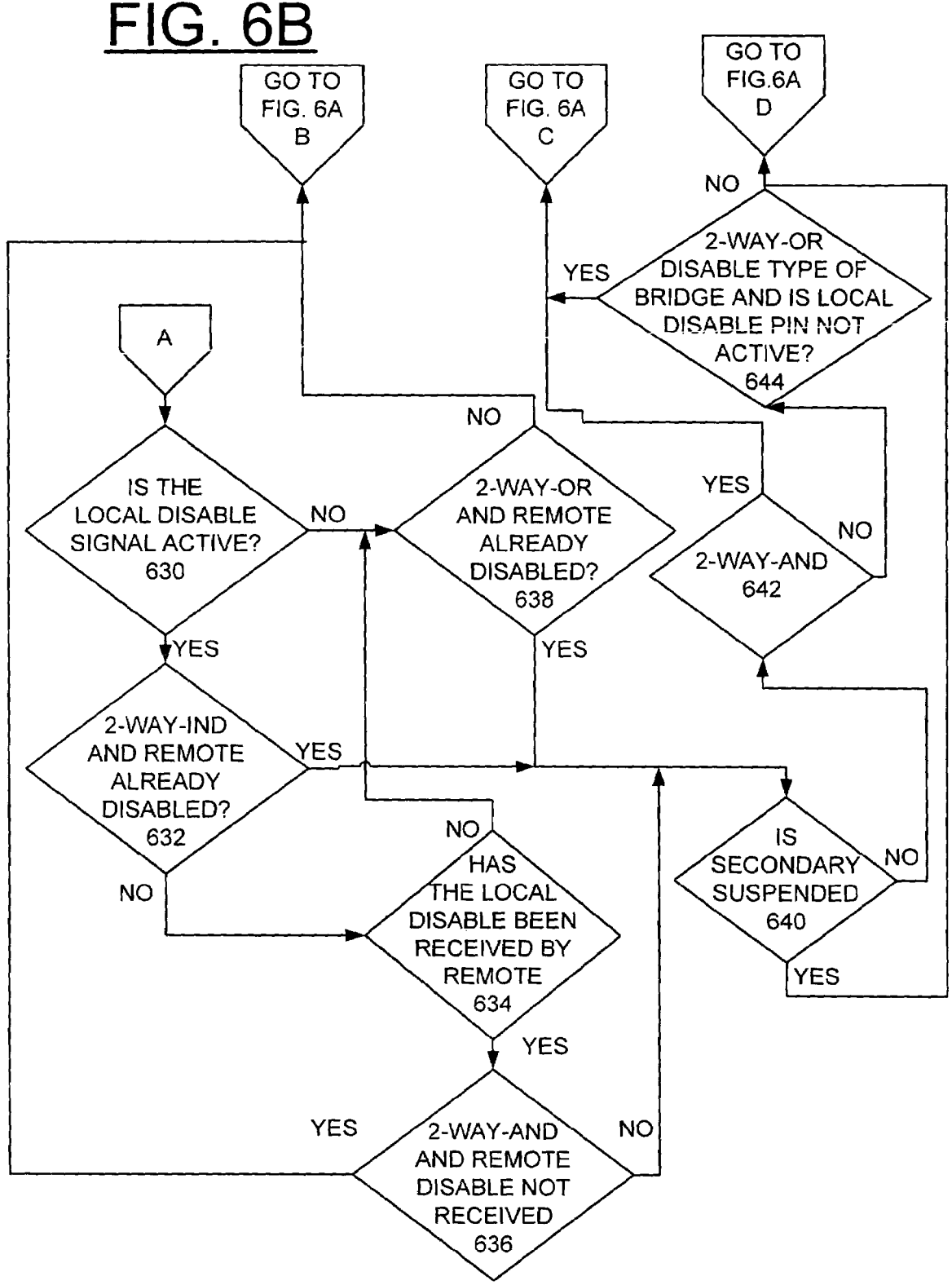

FIGS. 6A, and 6B illustrate exemplary logic flow operations of the primary side of a cosimulation in accordance with the preferred embodiment starting with an entry from primary or master simulator 104 as indicated in a block 600. For each secondary bridge, sequential evaluations are performed as shown in FIG. 6B and results are recorded as indicated in a block 602. Checking for a local disable signal is performed as indicated in a decision block 604. When a local disable signal is not identified at decision block 502, then a result of mark for exchange is provided as indicated in a block 606. The result of mark for exchange provided at block 606 also follows entry point B from sequential evaluations of FIG. 6B. A result of mark for no exchange, remote can end suspend is provided as indicated in a block 608 following entry point C from sequential evaluations of FIG. 6B. A result of mark for no exchange, remote cannot end suspend is provided as indicated in a block 610 following entry point D from sequential evaluations of FIG. 6B.

After results are marked for all cosimulation bridges connected to this master simulator 104 in respective blocks 606, 608, 610 and recorded at block 602, then checking whether one or more exchanges are needed as indicated in a decision block 614. When one or more exchanges are needed, then data are exchanged with all bridges marked exchange as indicated in a block 616. Then the sequential operations return to simulator as indicated in a block 618. When one or more exchanges are not needed, then checking whether the master suspend is present and active is performed as indicated in a decision block 620. If the master suspend is not present and active, then the sequential operations return to simulator at block 618 for the disable without any data exchange. If the master suspend is present and active, then checking whether one or more slave simulators can end the suspend is performed as indicated in a decision block 622. If one or more slave simulators 106 cannot end the suspend, then the cosimulation is terminated as indicated in a block 624. If one or more slave simulators 106 can end the suspend, then waiting for a change to occur on a slave simulator is provided as indicated in a block 626. When a local disable signal is identified at decision block 604, then following entry point A in FIG. 6B, checking is performed to determine whether the local disable signal is active as indicated in a decision block 630.

Referring now to FIG. 6B following entry point A, checking whether the local disable signal is active or on is performed as indicated in a decision block 630. If so, then checking for the two-way-independent disable 408 and remote already disabled is performed as indicated in a decision block 632. If not two-way-independent disable 408 and remote already disabled, then checking if the local disable has been received by the remote as indicated in a decision block 634. If the local disable has been received by the remote, then checking for two-way-AND 422 and remote disable not received is performed as indicated in a decision block 636. If the local disable has not been received by the remote at decision block 634 and when the local disable signal is not active at decision block 630, then checking for two-way-OR and remote already disabled is performed as indicated in a decision block 638.

When two-way-OR and remote already disabled is not identified and when two-way-AND 422 and remote disable not received is identified, then the result is marked for exchange at block 606 in FIG. 6A following entry point B. Otherwise, when two-way-independent disable 408 and remote already disabled is identified at decision block 632, when two-way-AND 422 and remote disable not received is not identified at decision block 636, and when two-way-OR and remote already disabled is identified at decision block 638, checking if the secondary is suspended as indicated in a decision block 640.

If the secondary is suspended, then the result is marked for no exchange, remote cannot end suspend at block 610 in FIG. 6A following entry point D. If the secondary is not suspended, then checking for the two-way-AND 422 is performed as indicated in a decision block 642. If a cosimulation bridge with a 2-sided logically ANDed disable is identified at decision block 642, then the result is marked for no exchange, remote can end suspend at block 608 in FIG. 6A following entry point C.

If the two-sided logically ANDed disable is not identified at decision block 642, then checking for the two-way-OR 414 and local disable signal not active is performed as indicated in a decision block 644. This is checking if a two-way-OR 414 is disabled because of the remote slave simulator 106 side. This could only be true if the navigated path was no at decision block 630, yes at decision block 638, no at decision block 640, no at decision block 642 to decision block 644, as opposed to starting with yes at decision block 630. If the two-sided logically ORed disable and local disable signal off is identified at decision block 644, then the result is marked for no exchange, remote can end suspend at block 608 in FIG. 6A following entry point C. If the 2-sided logically ORed disable and local disable signal off is not identified at decision block 644, then the result is marked for no exchange, remote cannot end suspend at block 610 in FIG. 6A following entry point D.

Figure 7:
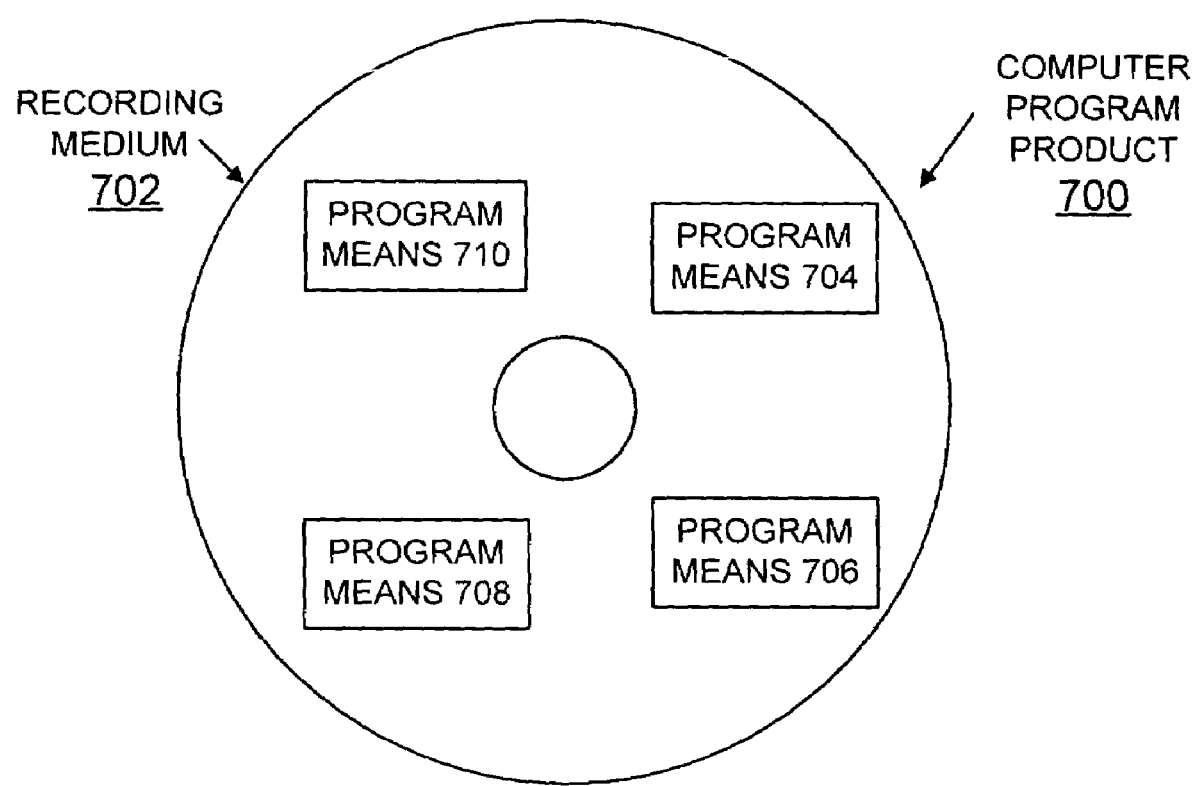
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape. Recording medium 702 stores program means 704, 706, 708, 710 on the medium 702 for carrying out the methods for implementing dynamic cosimulation of the preferred embodiment in the system 100 of FIG. 1A or system 200 of FIG. 2A.

A sequence of program instructions or a logical assembly of one or more interrelated modules defined by the recorded program means 704, 706, 708, 710, direct the system 100 or system 200 for implementing dynamic cosimulation of the preferred embodiment.

While the present invention has been described with reference to the details of the embodiments of the invention shown in the drawing, these details are not intended to limit the scope of the invention as claimed in the appended claims.

What is claimed is:

1. A method for implementing dynamic cosimulation comprising the steps of:
   utilizing a cosimulation bridge for data exchange between a primary simulator and a secondary simulator;
   defining a plurality of user selected optimization control signals over said cosimulation bridge including the steps of defining a functional OR disable; said functional OR disable defining a common disable for both said primary simulator and said secondary simulator; either said primary simulator or said secondary simulator activating a functional OR disable to activate said common disable;
   identifying at least one user selected optimization control signal for disabling said cosimulation bridge; and
   dynamically disengaging said primary simulator and said secondary simulator for ending data exchange responsive to said disabling said cosimulation bridge.

2. A method for implementing dynamic cosimulation as recited in claim 1 further includes the steps of checking whether said identified at least one user selected optimization control signal for disabling said cosimulation bridge remains active; and responsive to said identified at least one user selected optimization control signal being inactive for enabling said cosimulation bridge.

3. A method for implementing dynamic cosimulation as recited in claim 2 further includes the steps of dynamically re-engaging said primary simulator and said secondary simulator for said data exchange responsive to said enabling said cosimulation bridge.

4. A method for implementing dynamic cosimulation as recited in claim 1 wherein the step of defining a plurality of user selected optimization control signals over said cosimulation bridge further includes the steps of defining a single sided disable; said single sided disable defining a disable control signal for one of said primary simulator or said secondary simulator.

5. A method for implementing dynamic cosimulation as recited in claim 1 wherein the step of defining a plurality of user selected optimization control signals over said cosimulation bridge further includes the steps of defining a two independent disable; said two independent disable defining a respective disable control signal for each of said primary simulator and said secondary simulator.

6. A method for implementing dynamic cosimulation as recited in claim 1 wherein the step of defining a plurality of user selected optimization control signals over said cosimulation bridge includes the steps of defining a suspend signal for each of said primary simulator and said secondary simulator.

7. A method for implementing dynamic cosimulation comprising the steps of:
utilizing a cosimulation bridge for data exchange between a primary simulator and a secondary simulator;
defining a plurality of user selected optimization control signals over said cosimulation bridge including the steps of defining a functional AND disable; said functional AND disable defining a common disable for both said primary simulator and said secondary simulator; both said primary simulator and said secondary simulator activating a functional AND disable to activate said common disables;
identifying at least one user selected optimization control signal for disabling said cosimulation bridge; and
dynamically disengaging said primary simulator and said secondary simulator for ending data exchange responsive to said disabling said cosimulation bridge.

8. Apparatus for implementing dynamic cosimulation comprising:
a cosimulation bridge for data exchange between a primary simulator and a secondary simulator:
a plurality of user selected optimization control signals defined over said cosimulation bridge including a functional OR disable; said functional OR disable for defining a common disable for both said primary simulator and said secondary simulator; said common disable being activated responsive to a functional OR disable control from either said primary simulator or said secondary; and
a control program for identifying at least one user selected optimization control signal for disabling said cosimulation bridge; and for dynamically disengaging said primary simulator and said secondary simulator for ending data exchange responsive to said disabling said cosimulation bridge.

9. Apparatus for implementing dynamic cosimulation as recited in claim 8 wherein said control program for identifying said identified at least one user selected optimization control signal being deactivated for enabling said cosimulation bridge and dynamically re-engaging said primary simulator and said secondary simulator for data exchange.

10. Apparatus for implementing dynamic cosimulation as recited in claim 8 wherein said plurality of user selected optimization control signals defined over said cosimulation bridge further include a plurality of disable control signals and a plurality of suspend signals.

11. Apparatus for implementing dynamic cosimulation as recited in claim 8 wherein said plurality of user selected optimization control signals defined over said cosimulation bridge include a two independent disable; said two independent disable for defining a respective disable control signal for each of said primary simulator and said secondary simulator.

12. Apparatus for implementing dynamic cosimulation comprising:
a cosimulation bridge for data exchange between a primary simulator and a secondary simulator;
a plurality of user selected optimization control signals defined over said cosimulation bridge including a functional AND disable; said functional AND disable for defining a common disable for both said primary simulator and said secondary simulator; said common disable being activated responsive to a functional AND disable control from both said primary simulator and said secondary simulator; and
a control program for identifying at least one user selected optimization control signal for disabling said cosimulation bridge; and for dynamically disengaging said primary simulator and said secondary simulator for ending data exchange responsive to said disabling said cosimulation bridge.

13. Apparatus for implementing dynamic cosimulation as recited in claim 12 wherein said plurality of user selected optimization control signals defined over said cosimulation bridge further include a single sided disable; said single sided disable for defining a disable control signal for one of said primary simulator and said secondary simulator.

14. Apparatus for implementing dynamic cosimulation as recited in claim 12 wherein said plurality of user selected optimization control signals defined over said cosimulation bridge further include a suspend signal for defining a respective suspend control signal for each of said primary simulator and said secondary simulator.

15. A computer program product for implementing dynamic cosimulation in a computer system including a cosimulation bridge for data exchange between a primary simulator and a secondary simulator, said computer program product including instructions executed by the computer system to cause the computer system to perform the steps of:
defining a plurality of user selected optimization control signals over said cosimulation bridge including the steps of defining a functional OR disable; said functional OR disable defining a common disable for both said primary simulator and said secondary simulator; either said primary simulator or said secondary simulator activating a functional OR disable to activate said common disable;
identifying at least one user selected optimization control signal for disabling said cosimulation bridge; and
dynamically disengaging said primary simulator and said secondary simulator for ending data exchange responsive to said disabling said cosimulation bridge.

* * * * *